United States Patent
Esquibel et al.

(10) Patent No.: US 6,490,059 B1
(45) Date of Patent: *Dec. 3, 2002

(54) ROTATABLE SHEET FEED SCANNER AND METHOD FOR USING THE SAME

(75) Inventors: Daniel M. Esquibel, Cheyenne, WY (US); Roydan Tomlinson, Fort Collins, CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 908 days.

(21) Appl. No.: 08/708,385

(22) Filed: Sep. 4, 1996

(51) Int. Cl.⁷ .................................................. H04N 1/00
(52) U.S. Cl. ........................................ 358/498; 271/9.01
(58) Field of Search .................... 358/498; 271/9.01, 271/9.02, 9.11, 9.12, 3.14, 298

(56) References Cited

U.S. PATENT DOCUMENTS

| | | | |
|---|---|---|---|
| 4,212,456 A | 7/1980 | Ruenzi | 271/4 |
| 4,299,380 A | 11/1981 | Ogihara et al. | 271/9 |
| 4,566,684 A | 1/1986 | Gysling | 271/117 |
| 4,570,919 A | 2/1986 | Huang | 271/9 |
| 4,577,849 A | 3/1986 | Watanabe | 271/9 |
| 4,667,947 A | 5/1987 | Costa et al. | 271/9 |
| 4,786,920 A | 11/1988 | Igarashi | 346/134 |
| 5,002,266 A | 3/1991 | Kikuchi et al. | 271/3 |
| 5,149,218 A | 9/1992 | Iwantani et al. | 400/625 |
| 5,171,006 A | 12/1992 | Naito | 271/9 |
| 5,312,196 A | 5/1994 | Hock et al. | 400/624 |
| 5,320,436 A | 6/1994 | Hock et al. | 400/283 |
| 5,391,009 A | 2/1995 | Stodder | 400/605 |
| 5,654,809 A | 8/1997 | Beeman et al. | 358/504 |
| 5,788,227 A | 8/1998 | Hendrix et al. | 271/3.2 |
| 5,796,492 A * | 8/1998 | Reifenstein, III | 358/400 |
| 5,895,928 A | 4/1999 | Kerschner | 250/559.37 |

FOREIGN PATENT DOCUMENTS

| | | | | |
|---|---|---|---|---|
| EP | 0 435 508 A2 * | 7/1991 | | H04N/1/00 |
| EP | 0435508 A | 7/1991 | | H04N/1/00 |
| EP | 0549989 A | 7/1993 | | B41J/23/02 |
| EP | 0 549 989 A2 * | 7/1993 | | B41J/23/02 |

* cited by examiner

*Primary Examiner*—Mark Wallerson
*Assistant Examiner*—Twyler Lamb

(57) ABSTRACT

A scanner is presented that may include a prism shaped, symmetric scanner that can be rotated to enable paper to be fed from the top or the bottom of the scanner. The scanner of the present invention may also include a button to control the direction of the motor so that the user can select to feed paper from either the top for automatic document feed operations or the bottom for single sheet feed operations. These and other advantages are accomplished in a desktop scanner that leverages the desktop real estate, while at the same time provides the scanner flexibility of an automatic document feed scanner.

8 Claims, 3 Drawing Sheets

ROTATABLE SHEET FEED SCANNER AND METHOD FOR USING THE SAME

FIELD OF THE INVENTION

The present invention relates generally to the field of scanners and more particularly to an automatic document feed scanner. In particular, this invention provides a rotatable, desktop sheet feed scanner.

BACKGROUND OF THE INVENTION

A scanner is a device which converts a visible image such as a photograph, transparency or printed paper into an electronic form suitable for copying, storing or processing by a computer. As technology evolves, there are more and more peripherals such as scanners that computers support. This improves the work efficiency of office workers, students, telecommuters, etc. Yet, the desktop is becoming so crowded that it is becoming difficult to find space to work.

Current desktop sheet feed scanners are either designed to feed paper in from the top or from the bottom. The top feed scanners offer the user the advantage of being able to feed multiple pages in at one time, thus, the user receives the automatic document feed functionality with the top feed scanner. However, the drawback to the top feed scanner is that the scanner requires space for the outputted paper. This deprives the user of desk space and undercuts the initial small footprint advantage of the scanner.

Bottom feed scanners, on the other hand, offer the user the full advantage of its small footprint. However, paper can only be fed into the scanner by hand, one sheet at a time. Accordingly, there is a need in the field of desktop, sheet feed scanners for a scanner that provides both a small footprint and the ability to perform automatic document feeding of multiple pages.

SUMMARY OF THE INVENTION

The above listed shortcomings of current desktop scanners is overcome by the scanner of the present invention. These and other advantages are accomplished in a desktop scanner that leverages the desktop real estate, while at the same time provides the scanner flexibility of an automatic document feed scanner. The scanner of the present invention may include a prism shaped, symmetric scanner that can be rotated to enable paper to be fed from the top or the bottom of the scanner. The scanner of the present invention may also include a button to control the direction of the motor so that the user can select to feed paper from either the top for automatic sheet feed or the bottom.

BRIEF DESCRIPTION OF THE DRAWINGS

The above and other objects, features and advantages of the present invention will be better understood by reading the following more particular description of the invention, presented in conjunction with the following drawings, wherein.

DETAILED DESCRIPTION OF THE PREFERRED EMBODIMENTS

Figure 1:
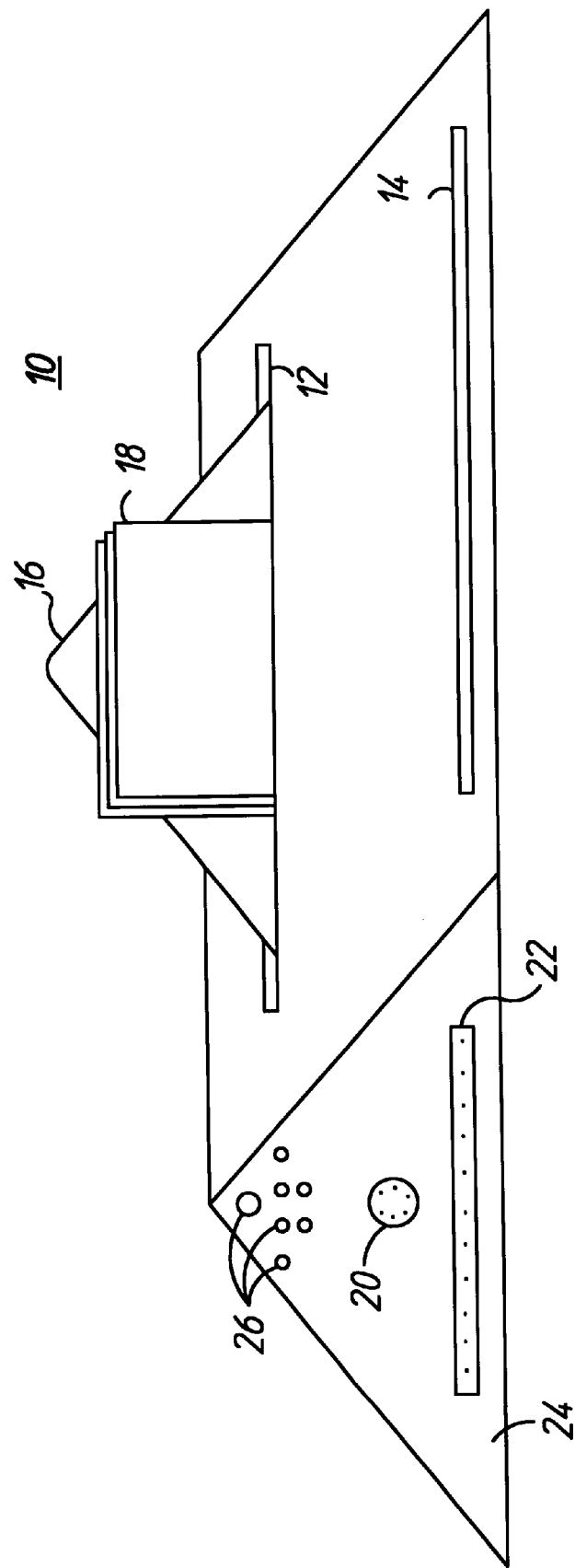
FIG. 1 shows a first embodiment of a prism-shaped, rotatable sheet feed scanner in a first position according to the present invention.

Referring to FIG. 1, a prism-shaped, rotatable, desktop, sheet feed scanner 10 according to a first embodiment of the present invention is shown. The basic operation of a scanner is well known and will not be taught herein. However, the operation of a scanner is disclosed in U.S. patent application Ser. No. 08/436,046 entitled "Automatic Document Presence, Width and Skew Detection Method and Apparatus for a Document Scanner" by Ronald Kerschner filed May 5, 1995 and in U.S. patent application Ser. No. 08/594,192 entitled "Method and Apparatus for Dynamic White Point Adjustment" by Edward Beeman et al. filed Jan. 31, 1996 which are incorporated herein for all that they teach.

Sheet feed scanner 10 is shaped like a prism and includes a document feed slot 12 with a document holding tray 16 to hold multiple documents 18 during the automatic document feed operation. Scanner 10 also includes a document exit slot 14 on the same side of the prism as the document feed slot 12. Document exit slot 14 may have a document holding tray similar to the document holding tray for the document feed slot 12. However, this is not necessary as the desktop could be utilized to catch the documents as they exit the scanner.

On one end 24 of the scanner is located any cable connections such as power 20 and a computer port connection 22, such as a parallel port or a SCSI port. Putting the cable connections on an end facilitates rotating the scanner's position. Any control buttons 26 for the rotatable scanner 10 may also be on one or both of the ends of the scanner 10 to further facilitate the rotatability of the scanner 10. Ideally, any control buttons 26 would be on the opposite end of the scanner 10 as the cable connections 20 and 22.

When the scanner 10 is in this position, the user has the advantage of the multiple page, automatic document feed operation. However, the drawback is that there must be clearance above the scanner 10 to accommodate the document tray holder 16 and space in front of the scanner 10 to accommodate catching paper as it exits the document exit slot 14. Accordingly, when the scanner 10 is in this position, it is more user friendly in terms of handling multiple pages in a hands-free mode. Yet, when the scanner 10 is in this position, it takes-up valuable desktop real estate.

Figure 2:
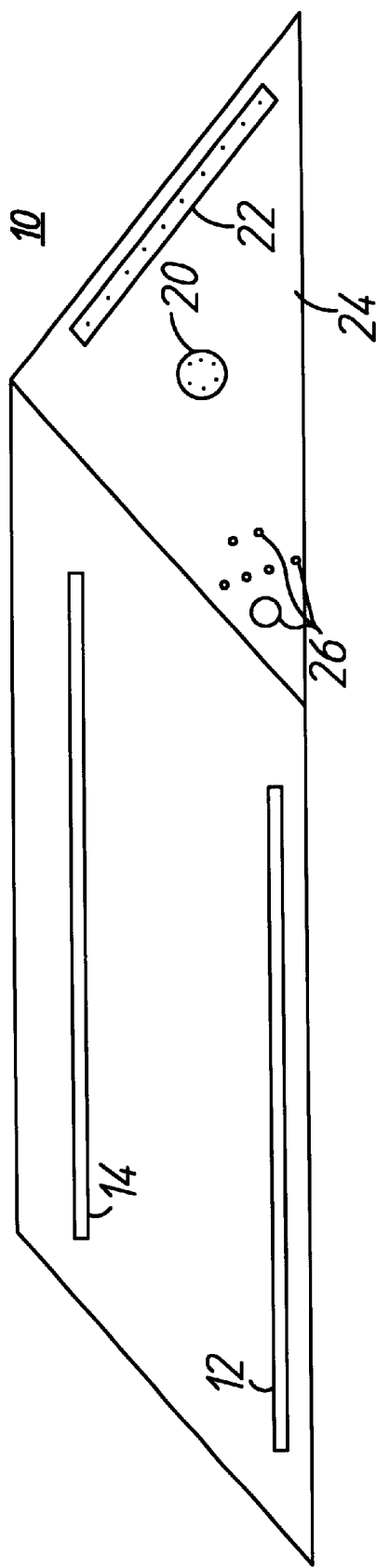
FIG. 2 shows the first embodiment of a prism-shaped, rotatable sheet feed scanner in a second position according to the present invention.

FIG. 2 shows the prism-shaped, sheet feed scanner of FIG. 1 rotated to a second side of the prism so that the document feed slot 12 is at the bottom of the scanner 10 nearest the desktop and the document exit slot 14 is at the top of the scanner 10 furthest away from the desk top. When the scanner 10 is in this position, documents are fed into document feed slot 12 by hand, one sheet at a time and exit from document exit slot 14. Document exit slot 14 may have a document tray to catch the paper as it exits the scanner 10, although this is probably not necessary because when the scanner 10 is in this position, paper is fed into the scanner one sheet at a time and the scan process is slow enough for the user to catch the paper as it exits from slot 14. Also, a document tray would take away from the small footprint feature of the scanner in this position. This position of the scanner 10 makes for a slower, hands-on type of scan procedure. However, the advantage is that the scanner 10 and the document feed and exit areas will take-up less valuable desktop real estate.

Accordingly, scanner 10 permits the end user to have both the feature of a small footprint scanner that does not take-up unnecessary desktop real estate and the feature of an automatic document feed scanner in one scanner. As the end user's needs change, he can rotate the position of the scanner 10 to meet his needs.

Figure 3:
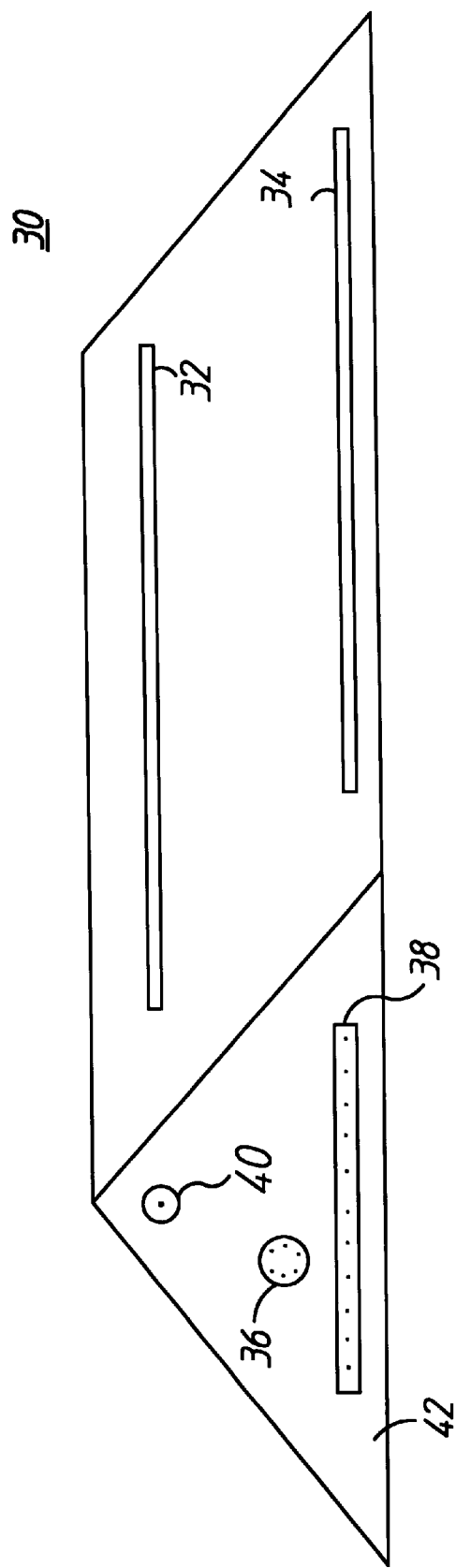
FIG. 3 shows a second embodiment of a prism-shaped, rotatable sheet feed scanner according to the present invention.

FIG. 3 shows a prism-shaped sheet feed scanner 30 that includes a document feed/exit slot 32, a document exit/feed slot 34 and a button 40 that switches the motor direction. In operation, the user would select whether he wanted to feed from the top slot 32, and thus, utilize the scanner's automatic document feed function or feed from the bottom slot 34, and thus, save additional desktop and overhead space. The user than merely pushes the button 40 to get the motor of the scanner 30 to pull the document from either the top slot 32 or the bottom slot 34. It should be noted that the cable connections for power 36 and the computer port to a computer 38 could be on an end or on the back side of the scanner 30. Ideally, if the cable connections are on one end, the button 40 to switch the motor's direction and any other control buttons would be on the opposite end of the scanner 30.

The foregoing description of the present invention has been presented for purposes of illustration and description. It is not intended to be exhaustive or to limit the invention to the precise form disclosed, and other modifications and variations may be possible in light of the above teachings. For example, the shape of the scanner does not necessarily need to be prism-shaped, especially for the scanner of FIG. 3, which has the button 40 to switch the direction of the motor. The important feature is that the scanner is capable of being rotated to change from document feed slot on top to document feed slot at the bottom, and vice versa. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A sheet feed scanner, said scanner comprising:
   a body having at least a first side, a second side and a third side, said body also having a first end and a second end;
   a document input slot located on said first side of said body;
   a document output slot located on said first side of said body;
   at least one power connection port located on said first end of said body; and
   at least one computer port connection located on said first end of said body; said body being shaped in such a manner, said document input slot and said document output slot being located in such a manner, and said at least one power connection port and said at least one computer port connection being located in such a manner that said sheet feed scanner is capable of being rotated from a document input slot-up/document output slot-down position to a document input slot-down/document output slot-up position, wherein said sheet feed scanner is capable of normal operation in both said document input slot-up/document output slot-down position and said document input slot-down/document output slot-up position.

2. The sheet feed scanner according to claim 1 wherein said body of said scanner is prism shaped.

3. The sheet feed seanner according to claim 1 wherein when the scanner is positioned in the document input slot-up/document output slot-down position, the scanner is capable of operating in an automatic document feed mode of operation.

4. A sheet feed scanner having a motor for pulling a sheet of paper from an input slot through the scanner to an output slot, said scanner comprising:
   a body having at least a first side, a second side and a third side, said body also having a first end and a second end;
   a document input/output slot located on said first side of said body;
   a document output/input slot located on said first side of said body;
   at least one power connection port located on said first end of said body;
   at least one computer port connection located on said first end of said body; and
   a button on said body for switching the direction of the motor, such that when the motor is in one direction, said document input/output slot is the document input slot and the document output/input slot is the document output slot and the scanner is capable of performing automatic document feed scanning operations, when said motor is in the opposite direction, said document input/output slot is the document output slot and said document output/input slot is the document input slot and the scanner is capable of performing single sheet feed scanner operations.

5. A rotatable sheet feed scanner comprising an elongate body having a generally triangular cross-section, said elongate body having a first side, a second side, and a third side, said elongate body also having a document input slot located on the first side of said elongate body and a document output slot located on the first side of said elongate body, said document output slot being operatively associated with said document input slot so that a document fed into said document input slot is discharged from said document output slot after being scanned, said document input and output slots being located on the first side of said elongate body so that said elongate body may be rotated between a first position wherein said document input slot is located above said document output slot and a second position wherein said document output slot is located above said document input slot.

6. The rotatable sheet feed scanner of claim 5, further comprising a document feed reversing button operatively associated with said document input slot and said document output slot, said document feed reversing button being operable in a normal state wherein the document drawn into said document input slot is discharged from said document output slot and a reversed state wherein the document drawn into said document output slot is discharged from said document input slot.

7. A method for operating a rotatable sheet feed scanner, comprising:
   providing a rotatable sheet feed scanner with an elongate body having a generally triangular cross-section having a first side, a second side, and a third side, said elongate body also having a document input slot located on the first side of said elongate body and a document output slot located on said first side of said elongate body, said document output slot being operatively associated with said document input slot so that a document drawn into said document input slot is discharged from said document output slot after being scanned;
   positioning said rotatable sheet feed scanner in a first position so that said document input slot is located above said document output slot; and inserting a document to be scanned into said document input slot.

8. The method of claim 7, further comprising:

rotating said rotatable sheet feed scanner to a second position so that said document output slot is located above said document input slot;

inserting a document to be scanned into said document input slot; and retrieving the document from the document output slot as the document is discharged from the document output slot.

\* \* \* \* \*